United States Patent [19]

Ecker

[11] Patent Number: 5,226,762
[45] Date of Patent: Jul. 13, 1993

[54] SEALED HOLE-SAW ARBOR

[76] Inventor: Robert J. Ecker, 128 Carriage Rd., Chicopee, Mass. 01013

[21] Appl. No.: 926,855

[22] Filed: Aug. 6, 1992

[51] Int. Cl.$^5$ .............................................. B23B 51/04
[52] U.S. Cl. .................................. 408/204; 408/68; 408/209
[58] Field of Search .................. 144/20, 23; 408/68, 408/204, 206, 207, 209, 703

[56] References Cited

U.S. PATENT DOCUMENTS

| | | | |
|---|---|---|---|
| 2,349,400 | 5/1944 | Beckwith | 408/206 |
| 2,794,469 | 6/1957 | Shortell . | |
| 3,220,449 | 11/1965 | Franklin . | |
| 3,647,310 | 3/1972 | Morse . | |
| 3,758,221 | 9/1973 | Meshulam . | |
| 3,784,316 | 1/1974 | Bittern . | |
| 3,837,759 | 9/1974 | Bittern . | |
| 3,880,546 | 4/1975 | Segal . | |
| 3,973,862 | 8/1976 | Segal . | |
| 3,999,869 | 12/1976 | Clark et al. . | |
| 4,036,560 | 7/1977 | Clark et al. . | |
| 4,148,593 | 4/1979 | Clark . | |
| 4,669,928 | 6/1987 | Mediavilla . | |
| 5,035,548 | 7/1991 | Pidgeon . | |
| 5,154,552 | 10/1992 | Koetsch | 408/204 |

Primary Examiner—Daniel W. Howell
Attorney, Agent, or Firm—Donald S. Holland

[57] ABSTRACT

A sealed, quick-disconnect, hole-saw arbor is disclosed for affixing a hole saw to a drill. The arbor enables a standard hole saw to be firmly "snugged up" to a shoulder on the arbor, and then rotated without being "backed off" the shoulder, in order to align drive holes in the hole saw with adjustable drive bosses on the arbor. In the preferred embodiments, the sealed hole-saw arbor produces a gravity-responsive, reversible, one-way lock effect on a threaded mounting sleeve. Letter indicators "T" and "L" on the arbor help the user position the arbor in a tighten or loosen position. Holding the arbor so that the "T" is upright, positions the arbor in the tighten position. The mounting sleeve is thereby secured against movement in a tighten direction and the hole saw is then threaded onto the sleeve and "snugged up" to the shoulder on the sleeve. The hole saw and mounting sleeve can next be rotated together in an opposed direction, to line up the drive holes in the hole saw with the adjustable drive bosses on the arbor, that are then moved into the hole saw to prepare it for use. To disconnect the hole saw, the arbor is held so that the "L", 180° opposed to the "T", is upright. The mounting sleeve is thereby secured against rotation in a loosen direction, so that the hole saw can be unthreaded off of the sleeve.

14 Claims, 4 Drawing Sheets

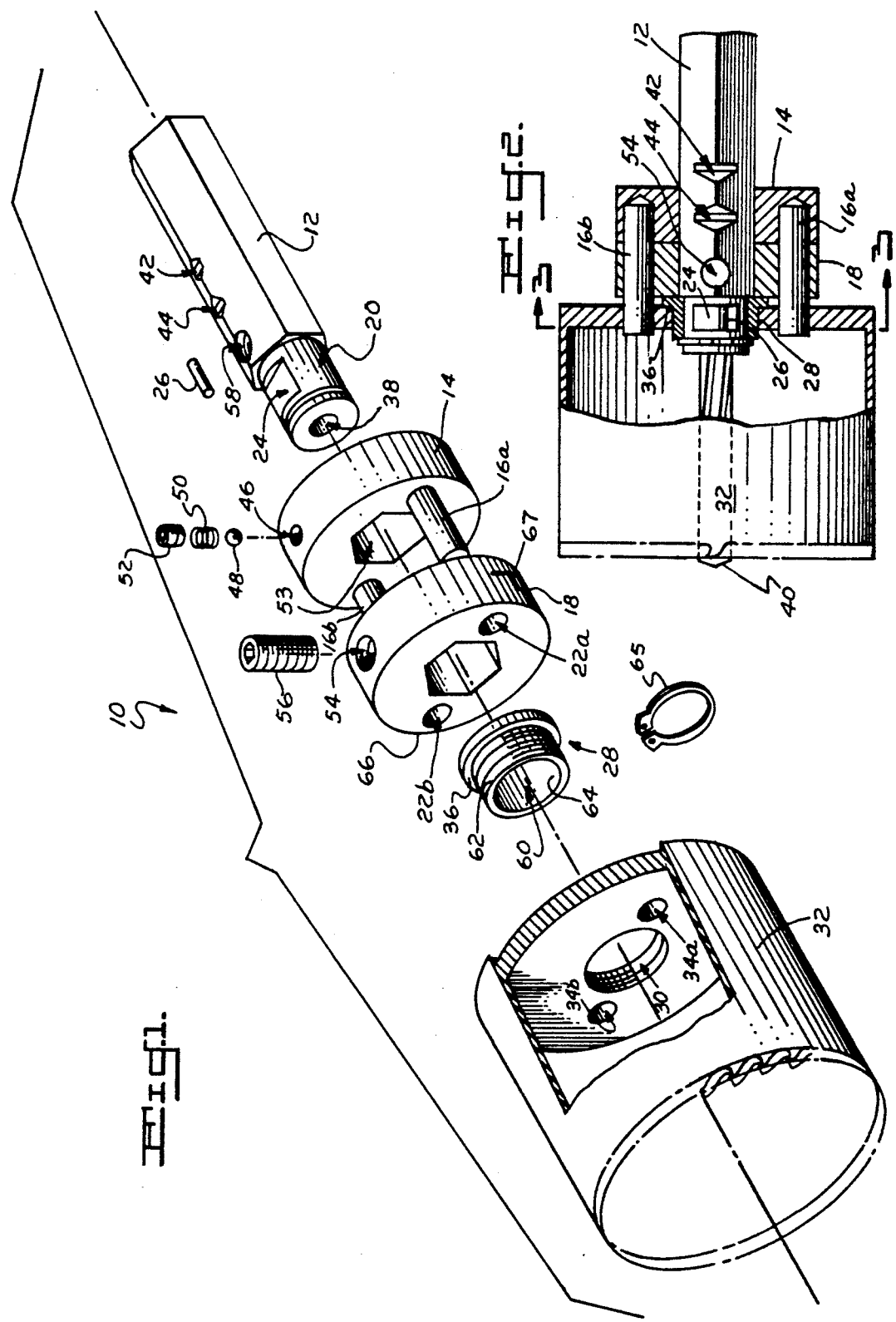

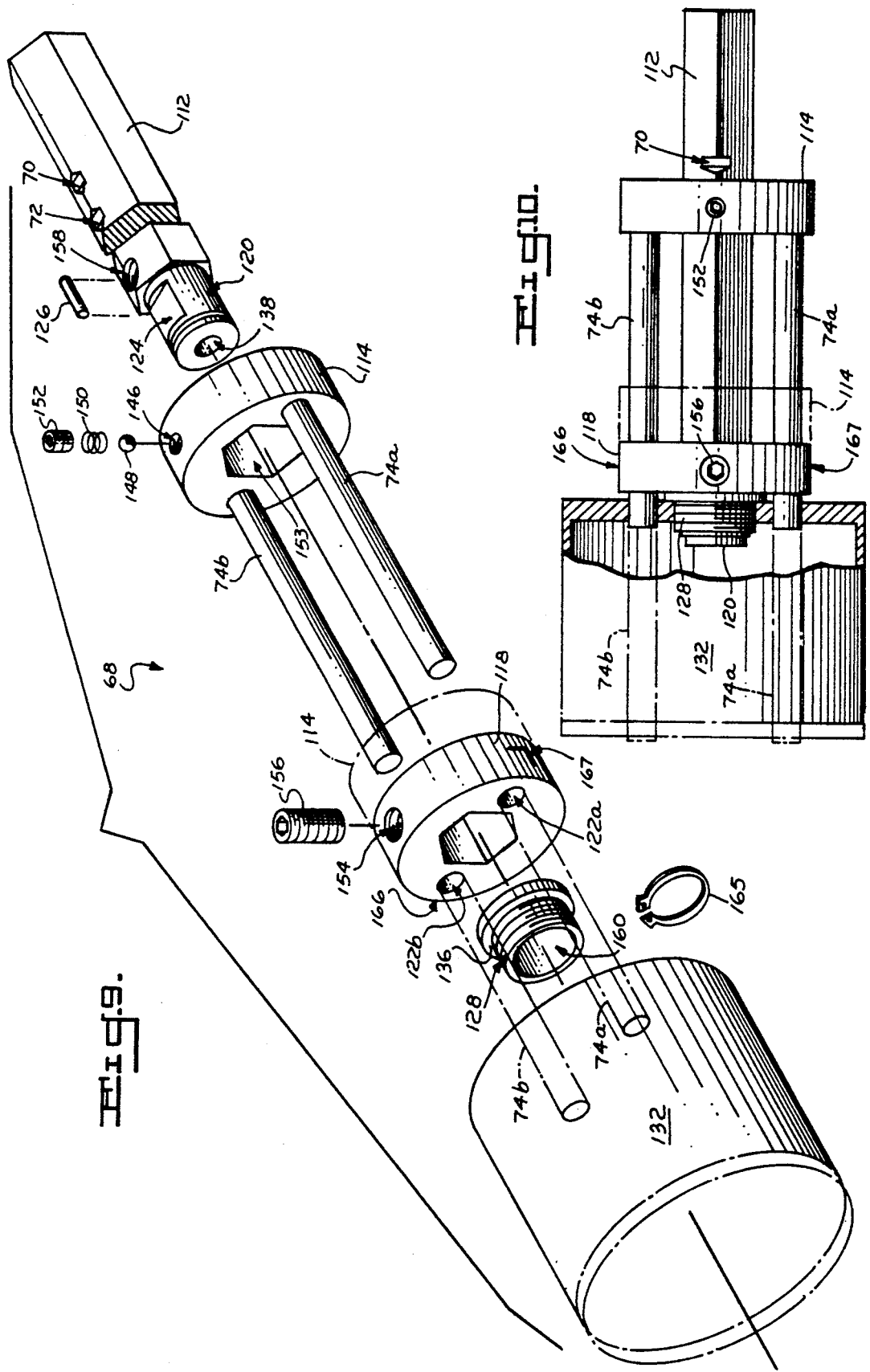

SEALED HOLE-SAW ARBOR

BACKGROUND OF THE INVENTION

The present invention relates to hole saws and, more particularly, to arbors for connecting them to drills.

Hole saws, affixed to portable hand-held drills, have broad application in the construction industry. Electricians and plumbers utilize them in building construction to prepare holes for passing large wires and pipes through building frames. They are also used for similar purposes in sheet metal aspects of the heating, ventilation and air conditioning industry.

A major factor in measuring competitive values of hole saws is the relative ease with which they can be affixed to common, portable, hand-held power drills. Hole-saw arbors have been developed to facilitate quick connection of hole saws to drills. Typically, an arbor is affixed by an integral drive shaft to a drill, and a hole saw is mated and secured to the arbor.

As shown in U.S. Pat. No. 4,036,560 to Clark et al., most current hole-saw arbors utilize a "quick disconnect" assembly, comprising a non-cylindrical drive shaft, a threaded receiving end of the shaft, and a drive collar slidably mounted on the shaft. The drive shaft is secured to a drill by conventional "chuck" means. A hole saw having a threaded, central securing hole, and two drive holes, is threaded onto the receiving end of the shaft, while the drive collar is in a retracted, or "mounting position". After the hole saw is "snugged up" to a shoulder adjacent the threads on the receiving end of the shaft, it is "backed off" to align drive pins, or "bosses", in the drive collar, with the drive holes in the saw. The drive collar then slides along the drive shaft to a "driving position", so that the drive bosses are inserted within the hole saw. The drive collar has an internal, axial aperture that matches the non-cylindrical shape of the drive shaft, so that axial rotation of the drive shaft also rotates the collar and affixed hole saw.

As the hole saw is utilized, occasionally a plug of material being cut lodges within the hole saw, or an operator wants to quickly switch to an alternative usage of the drill. The drive collar is then retracted to its mounting position, and the hole saw is unthreaded from the shaft. Any plug can then be easily pushed out of the hole saw, or the arbor can be removed, so that the drill is free for other purposes.

One major problem with this common type of "quick disconnect" hole-saw arbor system is that it limits efficiency of the hole saw and accuracy of resulting usage. By backing off the hole saw from firmly abutting the shoulder on the drive shaft, a certain amount of play is left between the shaft and hole saw. Consequently, the hole saw vibrates, or wobbles, during cutting. The resulting vibration decreases the accuracy of the cut, increases the amount of material being cut, and therefore the duration of hole saw use necessary to make the cut. Such increased wear and tear also decreases the useful life of the hole saw.

More recently, an improved "quick disconnect" hole-saw arbor has attempted to solve the "wobble" problem resulting from "backing off" the hole saw. The improved arbor calls for snugging up the hole saw against a shoulder on a threaded mounting shaft that is axially and rotatably adjustable within an encapsulating drive-boss housing or collar. The drive-boss housing includes an integral drive shaft at one end for attachment to a drill, and drive bosses at an opposed end, adapted to be inserted into corresponding drive holes in the hole saw. After the hole saw is "snugged up" to the shoulder on the mounting shaft, the shaft is rotated within the drive-boss housing to align the drive bosses with the drive holes in the hole saw. Then, the mounting shaft is moved axially within the housing from a mounting to a driving position, so that the drive bosses penetrate the drive holes. A spring-biased pivot arm on an exterior surface of the drive-boss housing moves a lock rod that secures the mounting shaft within either the mounting or driving position. Therefore, an operator's finger can depress the pivot arm to change positions.

Although such an improved "quick disconnect" pivot-arm arbor effectively solves the hole-saw "wobble" problem, the pivot-arm arbor has substantial deficiencies. During usage of a hole saw, saw dust and related fine particulate matter is invariably discharged into the air adjacent the arbor. The pivot-arm arbor includes moving parts that are unsealed, and exposed to such fine particles. Consequently, accumulation of the particles around the moving parts presents a substantial risk that the pivot arm, spring, or lock rod may become jammed, rendering the arbor unsafe or inoperable. Additionally, as the arbor spins during hole-saw use, centrifugal force will tend to push the lock rod and pivot arm out of engagement with the mounting shaft. This is especially a problem as the spring biasing the pivot arm necessarily ages and weakens. Finally, the complexity of the pivot-arm arbor mandates substantial manufacturing costs.

Consequently, because of inherent structural limitations, known hole-saw arbors are unable to afford safe, consistent, quick disconnection of hole saws from portable drills, while enabling an accurate cut and efficient use of the hole saw.

Accordingly, it is the general object of the present invention to provide an improved hole-saw arbor that overcomes the problems of the prior art.

It is another general object to provide an improved hole-saw arbor that affords safe, consistent, quick disconnection of the hole saw from an arbor affixing the saw to a drill.

It is yet another general object to provide an improved hole-saw arbor that facilitates quick disconnection of the hole saw from the arbor without utilization of additional tools.

It is a more specific object to provide a hole-saw arbor that eliminates vibration between a hole saw and an arbor affixed to the saw and drill.

It is another specific object to provide a hole-saw arbor that affords accurate cutting by the hole saw.

The above and other objects and advantages of this invention will become more readily apparent when the following description is read in conjunction with the accompanying drawings.

SUMMARY OF THE INVENTION

A sealed hole-saw arbor is disclosed for affixing hole saws to drills. The arbor is "secured" to a drill by a conventional "chuck" assembly, and a hole saw is affixed to the arbor.

In the preferred embodiment, the invention comprises a drive shaft having a drive-boss plate that is axially adjustable along the shaft, between mounting and driving positions. Drive bosses extend from the drive-boss plate and pass through boss slots in a drill plate affixed to the shaft. Adjacent the drill plate, a hole-saw mounting end of the drive shaft defines a lock cavity that houses a gravity-responsive lock member.

A threaded mounting sleeve, having a mounting shoulder, overlies the mounting end of the drive shaft. It is used to adjustably secure and seal the lock member between an interior wall of the mounting sleeve and the lock cavity. For example, axial rotation of the drive shaft to position the lock member in a first or tighten position, relative to the rotational axis of the shaft, causes the lock member to drop within the cavity so that it is pinched between the interior wall of the mounting sleeve and the lock cavity. Rotation of the mounting sleeve in a first direction is thereby prohibited, and rotation of the mounting sleeve in an opposed or second direction is permitted, thereby achieving a one-way lock effect on rotation of the mounting sleeve. Conversely, positioning the lock member in a second or loosen position relative to the rotational axis of the drive shaft, produces an opposite one-way lock effect, so that the mounting sleeve rotates freely in the first direction, but is prohibited from rotating in the opposite or second direction.

In use of the invention, an operator holds the drive shaft so that the lock member is in the first or tighten position, thereby securing the threaded mounting sleeve against rotational movement in the first direction. A hole saw is then threaded in the first direction onto the mounting sleeve until the hole saw is firmly snugged up against the mounting shoulder of the mounting sleeve. The hole saw is then rotated in the opposite or second direction until the boss slots in the drill plate line-up with drive holes in the hole saw. Because the lock member produces the one-way lock effect, rotation of the hole-saw in the second direction causes the mounting sleeve and its mounting shoulder to also rotate with the hole saw, so that the hole saw remains snugged up to the shoulder.

The drive-boss collar is then adjusted toward the hole saw from a mounting position to a driving position, so that the drive bosses pass through the drive holes in the hole saw. Rotational force from the drill can then be transferred through the drive shaft, drive-boss plate, drive bosses to the hole saw.

To remove the hole saw, the operator simply positions the drive-boss plate back in the mounting position, thereby retracting the drive bosses out of the hole-saw drive holes. Then, the drive shaft is positioned so that the lock member is in the loosen position, opposite the tighten position, so that the mounting sleeve is secured against rotational movement in a second direction, opposite the first direction. Therefore, rotation of the hole saw in the second direction causes the hole saw to unthread itself off of the mounting sleeve, until it is removed.

In a second preferred, or plug-ejection, embodiment of the sealed hole-saw arbor, an ejection drive-boss plate is adjustable between three positions on the drive shaft: a fully retracted or mounting position; an intermediate or driving position; and a plug-ejection position, wherein the ejection drive-boss plate is adjacent an ejection drill-plate, so that extended ejection drive bosses can extend from the ejection drive-boss plate through the ejection drill plate and into and substantially through an interior of a hole saw, to contact and eject from the hole saw any material or plug captured by the hole saw during use.

BRIEF DESCRIPTION OF THE DRAWINGS

FIG. 1 is a fragmentary, exploded, perspective view of a first preferred embodiment of a sealed hole-saw arbor constructed in accordance with the present invention, wherein a lock cavity and lock member are shown for producing a one-way lock effect on a threaded mounting sleeve;

FIG. 2 is a fragmentary side-plan view of the sealed hole-saw arbor of FIG. 1, showing components of the arbor assembled for use;

FIG. 9 is a fragmentary, exploded, perspective view of a second preferred, or plug-ejection, embodiment of the sealed hole-saw arbor constructed in accordance with the present invention; and FIG. 10 is a fragmentary side plan view of the FIG. 9 arbor, showing ejection drive bosses extended into a hole saw.

DETAILED DESCRIPTION OF THE PREFERRED EMBODIMENTS

Figure 3:
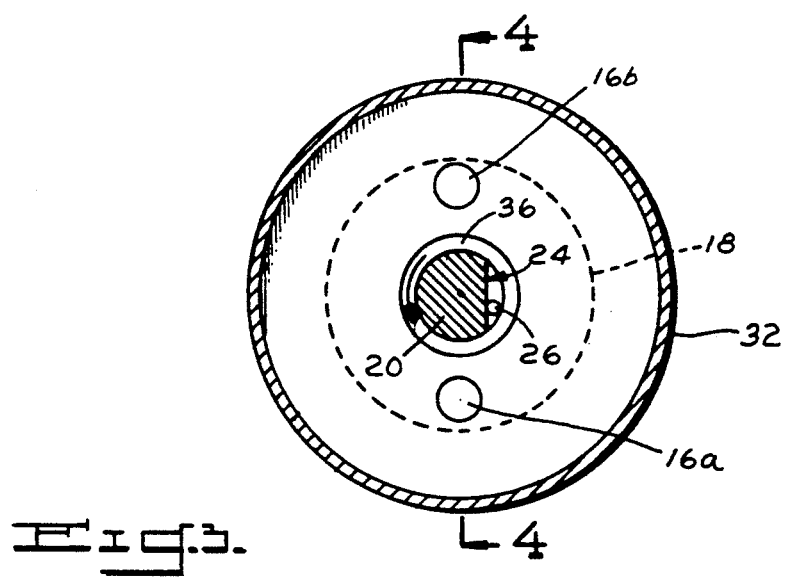
FIG. 3 is a cross-sectional view of the sealed hole-saw arbor, taken along line 3—3 of FIG. 2, showing the lock member in a "tighten position" within the lock cavity.

Commercial embodiments of the sealed hole-saw arbor of the present invention are being marketed under the trademark QWIK-ARBOR ™ by the Stenor Tool Company of Chicopee, Mass.

Referring to the drawings in detail, a first embodiment of a sealed hole-saw arbor is shown in FIGS. 1–8 and generally designated by the reference numeral 10. As best seen in FIG. 1, the sealed hole-saw arbor basically comprises a drive shaft 12, adapted to connect to a drill (not shown) by conventional "chuck" means; a drive-boss plate 14, affixed to drive shaft 12 in an axially, but not rotatably, adjustable relation, having drive bosses 16a,b extending from the plate 14; a drill plate 18 also affixed to the drive shaft 12 in an axially, but not rotatably, adjustable relation, adjacent a mounting end 20 of the shaft 12, and adapted to adjustably pass drive bosses 16a,b through boss slots 22a,b defined by the drill plate 18; a lock cavity 24, defined within the mounting end 20 of the drive shaft 12, that adjustably houses a gravity-responsive lock member 26; and a threaded mounting sleeve 28, rotatably encapsulating lock member 26 within lock cavity 24, that is adapted to mount a threaded slot 30 of hole saw 32 and adjustably align the hole saw 32, so that drive holes 34a,b within the hole saw adjustably receive drive bosses 16a,b after the hole saw is secured against a mounting shoulder 36 of the mounting sleeve 28.

Figure 4:
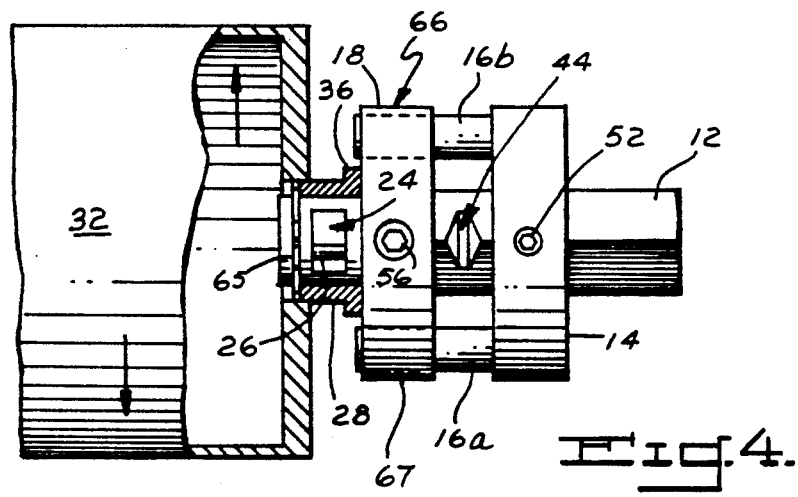
FIG. 4 is a fragmentary, side plan view of the FIG. 1 arbor, showing a drive-boss plate in a "mounting position", and showing a hole-saw commencing mounting on the arbor.

As best seen in FIGS. 1 and 2, drive shaft 12 includes a central pilot-drill throughbore 38 for receiving a pilot drill 40 (shown in FIGS. 2 and 4); a mounting position notch 42 for securing the drive-boss plate 14 in a mounting position (as shown in FIG. 4); and a driving position notch 44 for securing the plate 14 in a driving position (as shown in FIG. 2). Drive-boss plate 14 defines a positioning slot 46 adapted to house a positioning ball 48, positioning spring 50 and positioning screw 52, so that the screw 52 and spring 50 adjustably secure the ball 48 within positioning slot 46, thereby adjustably holding drive-boss plate 14 in a spring-biased relationship with mounting and driving position notches 42, 44. Drive-boss plate 14 is secured to drive shaft 12 so that it is only axially adjustable on the shaft 12, and not rotatably adjustable, by such means as a non-cylindrical drive-boss channel 53 that corresponds to a non-cylindrical exterior surface of drive shaft 12, as seen in FIG. 1.

Drill plate 18 defines a securing slot 54 adapted to house a securing screw 56 that passes through slot 54 into a securing throughbore 58 in the drive shaft 12 to secure the drill plate 18 in a fixed position on the shaft 12, and to secure the pilot drill 40 within pilot drill throughbore 38, as seen in FIG. 2. Threaded mounting sleeve 28 also defines a central passage 60 adapted to overlie the mounting end 20 of the drive shaft 12 and adjustably secure the lock member 26 in a gravity-responsive relationship between lock cavity 24 and an interior wall 64 of the mounting sleeve 28. The mounting end 20 of the drive shaft 12 also defines a securing groove 62 that receives a securing member such as snap ring 65, as seen in FIG. 1, to secure the threaded mounting sleeve 28 on the mounting end 20.

As best shown in FIGS. 2-5, hole saw 32 is mounted on the sealed hole-saw arbor 10 by first placing drive-boss plate 14 in the mounting position (shown in FIG. 4), wherein the positioning ball 48 within the drive-boss plate 14 rests within mounting position notch 42 of drive shaft 12, so that drive bosses 16a,b extend no further than boss slots 22a,b of the drill plate 18. Drill plate 18 is also secured within a fixed position on the drive shaft 12, by positioning securing screw 56 through the securing slot 54 in the drill plate 18 and into securing throughbore 58 in the drive shaft 12. Drive shaft 12 is then positioned by an operator (not shown) so that lock member 26 falls within lock cavity 24 to a tightened position, relative to the rotational axis of the drive shaft 12. As seen in FIGS. 3 and 4, because lock member 26 is sealed from visual observation by a threaded mounting sleeve 28, determination of the positioning of the lock member can be made with reference to the position of elements in a fixed relation to axial rotation of the drive shaft 12, such as the mounting and driving position notches 42, 44 or the securing slot 54 in the drill plate 18.

Interior wall 64 of the threaded mounting sleeve 28 is adapted to overlie lock cavity 24, so that when lock member 26 is in the tighten position, the lock member 26 is pinched between the cavity 24 and interior wall 64, thereby prohibiting threaded mounting sleeve 28 from rotating along the rotational axis of drive shaft 12 in a first or tighten direction. Threaded mounting sleeve 28 can, however, freely rotate in a second or loosen-direction opposed to the first direction, producing a desireable, reversible one-way lock effect or means, because movement in the second direction does not pinch lock member 26 between lock cavity 24 and interior wall 64, while the drive shaft 12 is held in the tighten position. Rotation of the threaded mounting sleeve in the second or loosen direction is shown by directional arrows in FIG. 3.

Figure 5:
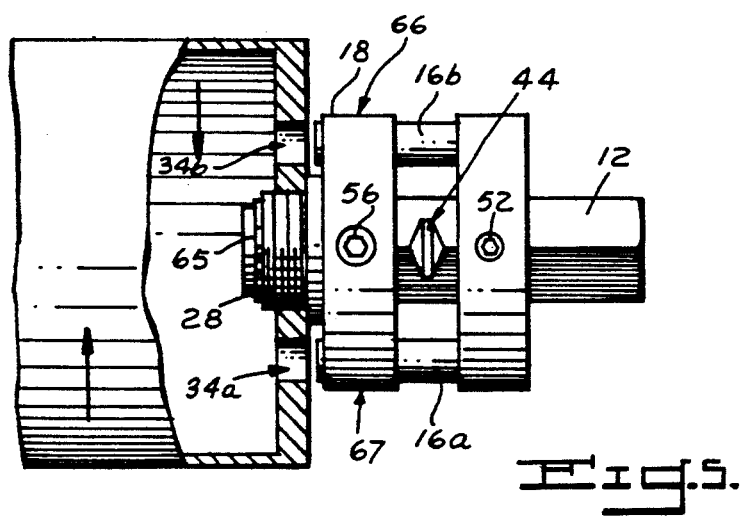
FIG. 5 is a fragmentary, side plan view of the FIG. 1 arbor, showing the hole-saw mounted on the arbor with drive holes in the hole saw aligned with drive bosses on the arbor.

As best seen in FIG. 4, the lock member 26 is maintained in the tighten position, while the operator threads the hole saw 32 onto the threaded mounting sleeve 28 by rotating the hole saw 32 in the first or tighten direction, until the hole saw 32 abuts, or is "snugged up" to the mounting shoulder 36 of the mounting sleeve 28. The operator continues to hold the drill shaft 12 so the lock member 26 is in the tighten position, while rotating the hole saw 32 in the opposed second or loosen direction, until drive holes 34a,b in the hole saw are aligned with the boss slots 22a,b in the drill plate 18, as seen in FIG. 5. Because the threaded mounting sleeve 28 can freely rotate in the second direction while the lock member 26 is in the tighten position, the hole saw 32 does not unthread itself from the mounting sleeve 28 when rotated in the second direction and, therefore, remains snugged up to the mounting shoulder 36 of the mounting sleeve 28.

The operator then moves drive-boss plate 14 from the mounting position to the driving position (as seen in FIG. 2), so that positioning ball 48 rests within driving position notch 44, and drive bosses 16a,b extend into drive holes 34a,b in the hole saw 32. Pilot drill 40 can then be inserted into pilot drill throughbore 38 of the drill shaft 12 and secured therein in a fixed position by securing screw 56. When drive shaft 12 is affixed to a drill (not shown) by conventional "chuck" means, rotational force can then be transferred from the drill through the drive shaft 12, drive-boss plate 14, drive bosses 16a,b to the hole saw 32.

Figure 6:
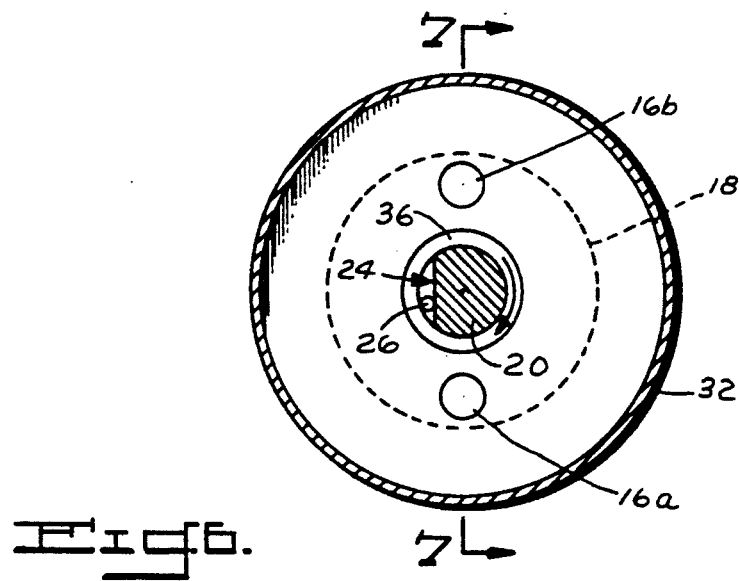
FIG. 6 is a cross-sectional view of the sealed hole-saw arbor, similar to FIG. 3, but with the lock member in a "loosen position" within the lock cavity.
Figure 7:
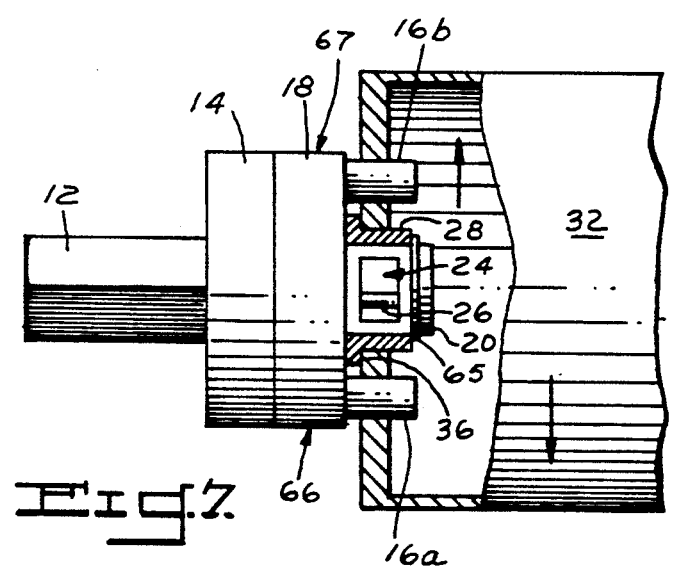
FIG. 7 is a fragmentary side plan view of the FIG. 1 arbor, showing the drive-boss plate in a driving position and showing the lock member in loosen position within the lock cavity.
Figure 8:
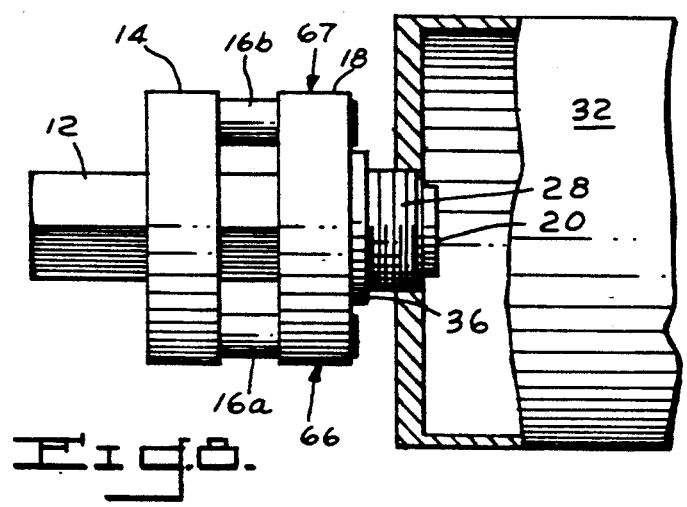
FIG. 8 is a fragmentary side plan view of the FIG. 1 arbor, showing the lock member in the loosen position and the hole saw being dismounted.

As best shown in FIGS. 6-8, to disconnect the hole saw 32 from the sealed hole-saw arbor 10, the operator simply partially unthreads securing screw 56 to permit removal of pilot drill 40 from pilot drill throughbore 38, and then moves the drive-boss plate 14 back to the mounting position, so that positioning ball 48 rests back in the mounting position notch 12 and drive bosses 34a,b are retracted out of the drive holes 34a,b of the hole saw 32. The operator then positions the drive shaft 12, so that lock member 26 falls within lock cavity 24 to a loosen position (best shown in FIG. 5) relative to the rotational axis of the drive shaft 12, which loosen position is approximately 180° opposed to the tighten position. The one-way lock effect or means is thereby reversed because lock member 26 is pinched between the interior wall 64 of the mounting sleeve 28 and the lock cavity 24, thereby prohibiting rotation of the mounting sleeve 28 in the second or loosen direction, but permitting rotation in the first or tighten position, as shown by the directional arrows in FIG. 6. Consequently, rotation by the operator of the hole saw 32 in the second direction causes the hole saw 32 to become unthreaded for removal from the threaded mounting sleeve 28, because the sleeve cannot rotate in the second direction. A different sized hole saw (not shown) could then be mounted on the sealed hole-saw arbor 10, or the arbor 10 could be removed from the drill for storage.

To simplify mounting and disconnection of the hole saw 32, the preferred drill plate 18 is cylindrical, and has two letters—"T" and "L"—stamped 180° apart on the cylinder (at 66 and 67). The letter "T" (at 66) serves as a tighten-position indicator, while the "L" (at 67) serves as a loosen-position indicator. As shown in FIGS. 4 and 5, if the operator holds drive shaft 12 so that the tighten-position indicator, or "T" 66, is in a first alignment, or upright, lock member 26 is in the tighten position and the hole saw 32 may be threaded onto threaded mounting sleeve 28 until the hole saw abuts, or is "snugged up" to, the mounting shoulder 36. If the operator rotates the drive shaft 12 180°, as shown in FIGS. 7 and 8, so that the loosen-position indicator, or "L" 67, is in the first alignment, or upright, lock member 26 would then be in the loosen position, and hole saw 32 may be unthreaded off of the threaded mounting sleeve 28.

A second preferred or plug-ejection embodiment of the sealed hole-saw arbor as shown in FIGS. 9, 10, and generally designated by the reference numeral 68. The plug-ejection embodiment shares most of the components of the first preferred embodiment of the sealed hole-saw arbor 10. For simplicity, where the components are identical, they are identified in FIGS. 9, 10 by the same reference number utilized in FIGS. 1–8, but increased by a factor of one hundred. For example, the lock cavity 24 and lock member 26 are identical in the first and second embodiments. In FIGS. 9 and 10, a lock cavity is identified by reference numeral 124, and a lock member is identified by reference numeral 126. Elements in the second embodiment 68 that are not identical to elements in the first embodiment, are identified by new reference numerals.

The only difference between the first embodiment 10 and the second or plug-ejection embodiment 68 is that an ejection mounting position notch 70 and an ejection driving position notch 72 are defined in the drive shaft 112, a sufficient distance away from a drill plate 118 so that ejection means, or ejection drive bosses 74a,b mounted on drive-boss plate 114 may pass into and substantially through hole saw 132 when the drive-boss mounting plate 114 is moved from ejection driving position notch 72 to abut the drill plate 118.

In use of the second or plug-ejection embodiment 68, the hole saw 132 is mounted to and disconnected from a threaded mounting sleeve 128 in the same manner as with the first embodiment 10, wherein the position of the lock member 126 within the lock cavity may be determined by reference to tighten- and loosen-position indicators, or "T" 166 and "L" 167, defined in drill plate 118. After the hole saw 132 is snugged up to a mounting shoulder 136 of the mounting sleeve and aligned with boss slots 122a,b in a drive plate 118, the drive-boss plate 114 is moved axially along the drive shaft 112 from ejection mounting position notch 70 to ejection driving position notch 72, so that ejection drive bosses 74a,b extend into drive holes 134a,b in the hole saw 132.

If an operator needs to eject a plug (not shown) of material entrapped within the hole saw 132 during use, the operator simply moves the drive-boss plate 114 from the ejection driving position notch 72 to abut drill plate 118, so that ejection drive bosses 74a,b extend substantially through the hole saw to contact and eject the plug, as shown in FIG. 10. Movement of the drive-boss plate 114 back to the ejection driving position notch 72 renders the plug-ejection embodiment of the sealed hole-saw arbor 68 ready for continued usage.

It should be understood, by those skilled in the art, that obvious structural modifications can be made without departing from the spirit of the invention. For example, the disclosed embodiments can be fabricated of the type of steel known and ordinarily used in arbor technology; or they can be fabricated of any material capable of transmitting appropriate force from a drill, through an arbor to a hole saw. Further, the illustrated lock members 26 and 126 are depicted as cylinders with lock cavities 24, 124 of corresponding dimensions. It should be understood that lock members in the shape of spheres or multiple spheres and other gravity-responsive forms, having lock cavities with corresponding dimensions to produce the described one-way lock effect, are meant to be within the scope of the invention. Accordingly, reference should be made primarily to the accompanying claims rather than the foregoing specification to determine the scope of the invention.

Having thus described the invention, what is claimed is:

1. A sealed hole-saw arbor for affixing a hole saw to a drill that comprises:
   a. a drive shaft, releasably secured to the drill, that transmits rotational force from the drill;
   b. a drive-boss plate, adjustably affixed to the drive shaft, that transmits rotational force from the drive shaft through at least one drive boss extending from the drive-boss plate;
   c. a threaded mounting sleeve, adjustably overlying a mounting end of the drive shaft, adapted to thread the hole saw to the drive shaft; and
   d. a reversible one-way lock means for permitting one-way rotation of the mounting sleeve in a first direction, wherein the hole saw is snugged up to a mounting shoulder on the mounting sleeve by rotational threading of the hole saw in a second direction, opposed to the first direction, and wherein at least one drive hole in the hole saw is aligned with the drive boss by rotation of the hole saw, mounting shoulder, and mounting sleeve in the first direction, so that adjustment of the drive-boss plate along the drive shaft toward the hole saw positions the drive boss within the drive hole, thereby transmitting rotational force to the hole saw.

2. The sealed hole-saw arbor of claim 1, wherein the reversible one-way lock means comprises:
   a. a gravity-responsive lock member housed within a lock cavity defined by the mounting end of the drive shaft; and
   b. an interior wall of the threaded mounting sleeve adapted to adjustably encapsulate the lock member within the lock cavity, so that the lock member is pinched between the lock cavity and the interior wall when the lock member is in a first position within the lock cavity, wherein the lock member prohibits rotation of the threaded mounting sleeve in the first direction, and the lock member prohibits rotation of the threaded mounting sleeve in the second direction, opposed to the first direction, when the lock member is in a second position within the lock cavity.

3. The sealed hole-saw arbor of claim 1, wherein the hole saw includes a plurality of drive holes, and the drive-boss plate includes a corresponding plurality of drive bosses.

4. The sealed hole-saw arbor of claim 3, further comprising a drill plate affixed to the drive shaft between the drive-boss plate and the mounting end of the drive shaft, said drill plate having a plurality of boss slots, each boss slot being adapted to slidably house a drive boss.

5. The sealed hole-saw arbor of claim 4, wherein the drive-boss plate includes a plurality of ejection drive bosses adapted to pass into and substantially through an interior of the hole saw so that a plug of material entrapped within the hole saw is ejected out of the hole saw by the ejection drive bosses.

6. In a hole-saw arbor for affixing hole saws to drills, wherein the arbor includes a drive shaft releasably secured to the drill that transmits rotational force from the drill, a drive boss, adjustably secured to the shaft and adapted to transmit rotational force from the drive shaft to a hole saw affixed to a mounting end of the drive shaft, the improvement comprising a sealed, reversible one-way lock that includes a gravity-responsive lock member housed within a lock cavity in the mounting end of the drive shaft and a threaded mounting sleeve adapted to rotatably overlie the mounting end and thereby thread the hole saw to the drive shaft, said mounting sleeve having an interior wall adapted to adjustably encapsulate the lock member within the lock cavity, so that the lock member is pinched between the lock cavity and the interior wall when the lock member is in a first position within the lock cavity, wherein the lock member prohibits rotation of the mounting sleeve in a first direction, and the lock member prohibits rotation of the mounting sleeve in a second direction, opposed to the first direction, when the lock member is in a second position within the lock cavity.

7. The improvement of claim 6, further comprising at least one ejection drive boss extending from the drive-boss plate, said ejection drive boss adapted to pass into and substantially through an interior of the hole saw, so that a plug of material entrapped within the hole saw is ejected out of the hole saw by the ejection drive boss.

8. A sealed hole-saw arbor for affixing a hole saw to a drill that comprises:
   a. a drive shaft releasably secured to the drill;
   b. a drive-boss plate adjustably affixed to the drive shaft, including at least one drive boss extending from the plate;
   c. a threaded mounting sleeve, adjustably overlying a mounting end of the drive shaft adapted to thread the hole saw to the drive shaft and align at least one drive hole in the hole saw with the drive boss; and
   d. a sealed, reversible one-way lock that includes a gravity-responsive lock member housed within a lock cavity in the mounting end of the drive shaft, and an interior wall of the threaded mounting sleeve adapted to adjustably encapsulate the lock member within the lock cavity, so that the lock member is pinched between the lock cavity and the interior wall when the lock member is in a first position within the lock cavity, thereby prohibiting rotation of the threaded mounting sleeve in a first direction, and the lock member is pinched between the lock cavity and the interior wall when the lock member is in a second position within the lock cavity, thereby prohibiting rotation of the threaded mounting sleeve in a second direction, opposed to the first direction.

9. The sealed hole-saw arbor of claim 8, wherein the hole saw includes a plurality of drive holes and the drive-boss plate includes a corresponding plurality of drive bosses.

10. The sealed hole-saw arbor of claim 9, further comprising a drill plate affixed to the drive shaft between the drive-boss plate and the mounting end of the drive shaft, said drill plate having a plurality of boss slots, each boss slot being adapted to slidably house a drive boss.

11. The sealed hole-saw arbor of claim 8, wherein the drive-boss plate includes a plurality of ejection drive bosses adapted to pass into and substantially through an interior of the hole saw, so that a plug of material entrapped within the hole saw is ejected out of the hole saw by the ejection drive bosses.

12. A sealed hole-saw arbor for affixing a hole saw to a drill that comprises:
   a. a drive shaft releasably secured to the drill;
   b. a drive-boss plate adjustably affixed to the drive shaft, including at least one drive boss extending from the plate;
   c. a threaded mounting sleeve, adjustably overlying a mounting end of the drive shaft adapted to thread the hole saw to the drive shaft and align at least one drive hole in the hole saw with the drive boss;
   d. a drill plate affixed to the drive shaft between the drive-boss plate and the mounting end of the shaft, said drill plate having at least one boss slot adapted to slidably house a drive boss, said drill plate defining a tighten-position indicator and an opposed loosen-position indicator; and
   e. a sealed, reversible one-way lock that includes a gravity-responsive lock member housed within a lock cavity in the mounting end of the drive shaft, and an interior wall of the threaded mounting sleeve adapted to adjustably encapsulate the lock member within the lock cavity, so that when the tighten-position indicator is in a first alignment, the lock member is pinched in a first position between the lock cavity and the interior wall, thereby prohibiting rotation of the threaded mounting sleeve in a first direction, and when the loosen-position indicator is in the first alignment, the lock member is pinched in a second position between the lock cavity and the interior wall, thereby prohibiting rotation of the threaded mounting sleeve in a second direction, opposed to the first direction.

13. The sealed hole-saw arbor of claim 12, wherein the tighten-position indicator comprises a letter "T".

14. The sealed hole-saw arbor of claim 13, wherein the loosen-position indicator comprises a letter "L".

* * * * *